United States Patent
Mason et al.

(10) Patent No.: US 7,037,482 B2
(45) Date of Patent: May 2, 2006

(54) SOLVENT EXTRACTION OF A HALIDE FROM A AQUEOUS SULPHATE SOLUTION

(75) Inventors: Cashman R. S. Mason, Rossland (CA); Juris R. Harlamovs, Fruitvale (CA); David B. Dreisinger, Delta (CA); Baruch Grinbaum, Tivon (IL)

(73) Assignee: Teck Cominco Metals Ltd., Vancouver (CA)

(*) Notice: Subject to any disclaimer, the term of this patent is extended or adjusted under 35 U.S.C. 154(b) by 53 days.

(21) Appl. No.: 10/383,774

(22) Filed: Mar. 10, 2003

(65) Prior Publication Data
US 2004/0179991 A1    Sep. 16, 2004

(51) Int. Cl.
C01B 17/96 (2006.01)
C01B 9/00 (2006.01)
C01B 9/02 (2006.01)
C01B 9/08 (2006.01)
C01B 11/18 (2006.01)

(52) U.S. Cl. .................... 423/544; 423/99; 423/475; 423/501; 423/658.5; 423/DIG. 14

(58) Field of Classification Search ............. 423/475, 423/501, 544, 658.5, DIG. 14, 99
See application file for complete search history.

(56) References Cited

U.S. PATENT DOCUMENTS

| | | | | |
|---|---|---|---|---|
| 1,901,925 A * | 3/1933 | O'Brien et al. | ............. | 423/103 |
| 2,864,668 A * | 12/1958 | Baldwin | ............. | 423/10 |
| 3,055,754 A * | 9/1962 | Fletcher | ............. | 423/24 |
| 3,211,526 A * | 10/1965 | Crouse, Jr. | ............. | 423/530 |
| 3,393,046 A * | 7/1968 | Giganov et al. | ............. | 423/544 |
| 3,582,290 A * | 6/1971 | Grinstead | ............. | 423/6 |
| 3,666,446 A * | 5/1972 | Cook et al. | ............. | 423/139 |
| 3,923,976 A * | 12/1975 | Vega et al. | ............. | 423/99 |
| 4,005,174 A * | 1/1977 | Bodson | ............. | 423/43 |
| 4,203,964 A * | 5/1980 | Reinhardt et al. | ............. | 423/658.5 |
| 4,882,134 A | 11/1989 | Mizrahi | | |
| 5,192,443 A * | 3/1993 | Delloye et al. | ............. | 210/634 |
| 5,597,545 A * | 1/1997 | Chang et al. | ............. | 423/484 |
| 5,632,966 A * | 5/1997 | Van Der Puy et al. | ............. | 423/484 |
| 5,788,844 A * | 8/1998 | Olafson | ............. | 210/634 |
| 5,980,753 A * | 11/1999 | Itano et al. | ............. | 210/670 |
| 6,200,545 B1 * | 3/2001 | Dreisinger | ............. | 423/371 |
| 6,375,923 B1 * | 4/2002 | Duyvesteyn et al. | ............. | 423/610 |
| 6,440,224 B1 * | 8/2002 | Wei et al. | ............. | 134/3 |
| 6,579,377 B1 * | 6/2003 | Wei et al. | ............. | 134/3 |
| 6,692,709 B1 * | 2/2004 | Nakon | ............. | 423/157 |

FOREIGN PATENT DOCUMENTS

DE    2136557    2/1972

(Continued)

OTHER PUBLICATIONS

Chemical Land21.com printout for Tributyl Phosphate (downloaded from www.chemicalland21.com on Sep. 30, 2004).*

(Continued)

*Primary Examiner*—Stanley S. Silverman
*Assistant Examiner*—Ardith E Hertzog
(74) *Attorney, Agent, or Firm*—Russell Reyneke Law Corp.; Elbie R. de Kock

(57) ABSTRACT

A method of extracting a halide and sulphate from an aqueous sulphate solution, such as a zinc sulphate solution, comprises subjecting the solution to solvent extraction to extract halide and sulphate from the solution and controlling the amount of sulphate extracted by selective adjustment of the acidity of the aqueous solution.

38 Claims, 6 Drawing Sheets

FOREIGN PATENT DOCUMENTS

| | | |
|---|---|---|
| GB | 1366380 | 9/1974 |
| GB | 1371302 | 10/1974 |
| JP | 51-75617 * | 6/1976 |
| RU | 496237 | 4/1976 |
| RU | 667500 | 6/1979 |
| RU | 861313 | 9/1981 |
| RU | 994410 | 2/1983 |

OTHER PUBLICATIONS

English Translation of DE 2 136 557, published Feb. 1972.*

English Translation of SU 1186678, published Oct. 1985.*

Tang et al., "Study on extraction of zinc in sulfate under low pH conditions", Youse Jinshu, Yelian Bufen (Non-ferrous Metal), vol. 5, pp. 2-4, 2001.*

English Translation of JP 51-75617, published Jun. 1976.*

Hardwick, W.H.; Wace, P.F., "Hydrofluoric Acid Recovery by Amine Solvent Extraction", Chemical and Process Engineering, Jun. 1965, p. 283.

Alguacil, F.J.; Lopez, F.A., "The extraction of mineral acids by the phosphine oxide Cyanex 923", Hydrometallurgy 42 (1996) 245-255.

"The Recovery of Mineral Acids with CYANEX 923 Extractant", Technical Bulletin 89-01, Cyanamid, Niagara Falls, Canada.

Rickelton, W.A., "The Extraction of Mineral Acids with a Liquid Phosphine Oxide", Solvent Extraction in the process industries, Proceedings of ISEC'93, eds.: Logsdail D.H.; Slater, M.J., 731, 2, 1993.

Wisniewski, Maciej, "Extraction of arsenic from sulphuric acid solutions by Cyanex 923", Hydrometallurgy 46 (1997) 235-241.

Liao, W. Guihong, Y; Li, D., "Solvent extraction of cerium (IV) and fluorine (1) from sulphuric acid leaching of bastnasite by Cyanex 923", Solvent Extraction and Ion Exchange, 2001, 19, 243-259.

Hesford, E.; McKay H.A.C., "*The Extraction of Mineral Acids by Tri-n-Butyl Phosphate*", Atomic Energy Research Establishment, Harwell, Didcot, Berks, Received Aug. 29, 1959, pp. 156-164.

* cited by examiner

SOLVENT EXTRACTION OF A HALIDE FROM A AQUEOUS SULPHATE SOLUTION

FIELD OF THE INVENTION

This invention relates to the extraction of a halide, such as fluoride or chloride, or perchlorate, from an aqueous sulphate solution, such as a zinc sulphate solution. In particular, the invention relates to the extraction of both a halide and sulphate from such a solution by means of solvent extraction.

BACKGROUND OF THE INVENTION

In the recovery of metals, problems occur when one or more halides are present in the feed material. For example, a zinc sulphate solution with 200 mg/L each of fluoride and chloride can result from the leaching of a zinc oxide fume from a lead smelter slag fuming operation. The dissolved halides increase aluminum corrosion rates in electrowinning and can result in hygiene problems, particularly from emissions during electrowinning.

Apart from halide removal, it may be desirable to extract sulphate from metal sulphate solutions. While high extraction efficiencies of halides would generally be desirable, sulphate extraction requirements would be variable depending on plant sulphate bleed requirements and other factors.

It, accordingly, is an object of the present invention to provide a method for removal of halides from hydrometallurgical or other industrial aqueous solutions with the flexibility to vary the amount of sulphate or acid being co-extracted with the halide. The invention is the basis of the Teck Cominco Halogon™ process.

SUMMARY OF THE INVENTION

According to one aspect of the invention, there is provided a method of extracting a halide and sulphate from an aqueous sulphate solution containing the halide, comprising the steps of subjecting the sulphate solution to solvent extraction with an extractant to extract at least part of said halide and part of said sulphate from the solution to produce a loaded extractant; and controlling the amount of said sulphate extracted by selective adjustment of the acidity of the aqueous solution.

For the purposes of this specification, the term "halide" also includes a halogen-containing oxyanion, such as perchlorate.

The extractant may comprise a phosphine oxide or oxides, such as CYANEX™ 923 extractant (a phosphine oxide extractant, product of Cytec Industries), or a tertiary amine, more particularly, a trialkylamine, such as ALAMINE™ 336 extractant (a trialkyl amine extractant, product of Cognis, North America).

The extractant may comprise a mixture of a phosphine oxide, such as CYANEX™ 923 extractant, and a tertiary amine, such as ALAMINE™ 336 extractant. CYANEX™ 923 extractant is a mixture of four trialkylphosphine oxides, namely $R_3P(O)$, $R_2R'P(O)$, $RR'_2P(O)$ and $R_3P(O)$, where $R=[CH_3(CH_2)_6CH_2—]$: normal octyl and $R'=[CH_3(CH_2)_4CH_2—]$: normal hexyl.

The extractant may comprise a mixture of a tertiary amine, more particularly, a trialkylamine, such as ALAMINE™ 336 extractant, and a triallylphosphate, such as tributylphosphate (TBP), or other organic extractants either singly or in combinations thereof. These extractants are usually diluted by a hydrocarbon "diluent". The organic may be stripped of its halide and sulphate content by aqueous solutions, in most cases neutralizing agents, before recycling to the extraction stage. The neutralizing agents include for example ammonia, sodium hydroxide (caustic) or sodium carbonate (soda ash).

According to another aspect of the invention there is provided a method of extracting a halide and sulphate from an aqueous base metal sulphate solution containing the halide, comprising subjecting the sulphate solution to solvent extraction with a phosphine oxide to extract at least part of said halide and part of said sulphate from the aqueous solution.

According to a further aspect of the invention there is provided a method of extracting fluoride and sulphate from an aqueous sulphate solution containing the fluoride, comprising the step of subjecting the sulphate solution to solvent extraction with an extractant comprising a mixture of a tertiary amine and a trialkylphosphate.

According to a further aspect of the invention there is provided a method of extracting perchlorate from an aqueous sulphate solution of a base metal containing the perchlorate, comprising the step of subjecting the solution to solvent extraction with an extractant comprising a mixture of a tertiary amine and a trialkylphosphate.

According to another aspect of the invention there is provided a method of extracting fluoride from an aqueous sulphate solution containing the fluoride, comprising the step of subjecting the sulphate solution to solvent extraction with an extractant comprising a mixture of a tertiary amine and a trialkylphosphate.

According to a further aspect of the invention there is provided a method of extracting chloride from an aqueous sulphate solution containing the chloride, comprising the step of subjecting the sulphate solution to solvent extraction with an extractant comprising a secondary amine.

According to another aspect of the invention there is provided a method of extracting chloride from an aqueous sulphate solution containing the chloride, comprising the step of subjecting the sulphate solution to solvent extraction with an extractant comprising a quaternary amine.

According to a further aspect of the invention there is provided a method of extracting a halide and sulphate from an aqueous solution by subjecting the solution to solvent extraction to produce a strip liquor containing the halide and sulphate and a low halide raffinate, wherein the aqueous solution is obtained from a first feed stream comprising a halide-containing aqueous sulphate solution and a second feed stream comprising an acidic sulphate solution.

According to another aspect of the invention there is provided a method of extracting chloride and fluoride from an aqueous sulphate solution containing the halides, comprising the step of subjecting the sulphate solution to solvent extraction with an extractant comprising a mixture of a phosphine oxide and a tertiary amine to extract at least part of the chloride and the fluoride.

According to a further aspect of the invention there is provided a method of extracting chloride and fluoride from an aqueous sulphate solution containing the halides, comprising the step of subjecting the sulphate solution to solvent extraction with an extractant comprising a mixture of a tertiary amine and a trialkylphosphate to extract at least part of the chloride and the fluoride.

According to another aspect of the invention there is provided a method of extracting a halide and sulphate from a first aqueous sulphate solution containing the halide, comprising the steps of subjecting the first sulphate solution to solvent extraction with an extractant to extract at least part of said halide and part of said sulphate from the first solution; and subjecting a second acidic sulphate solution to said solvent extraction along with said first aqueous sulphate solution to produce a loaded extractant.

Further objects and advantages of the invention will become apparent from the description of preferred embodiments of the invention below.

BRIEF DESCRIPTION OF THE DRAWINGS

The invention will now be described, by way of examples, with reference to the accompanying drawings, in which.

DETAILED DESCRIPTION OF THE PREFERRED EMBODIMENTS

Figure 1:
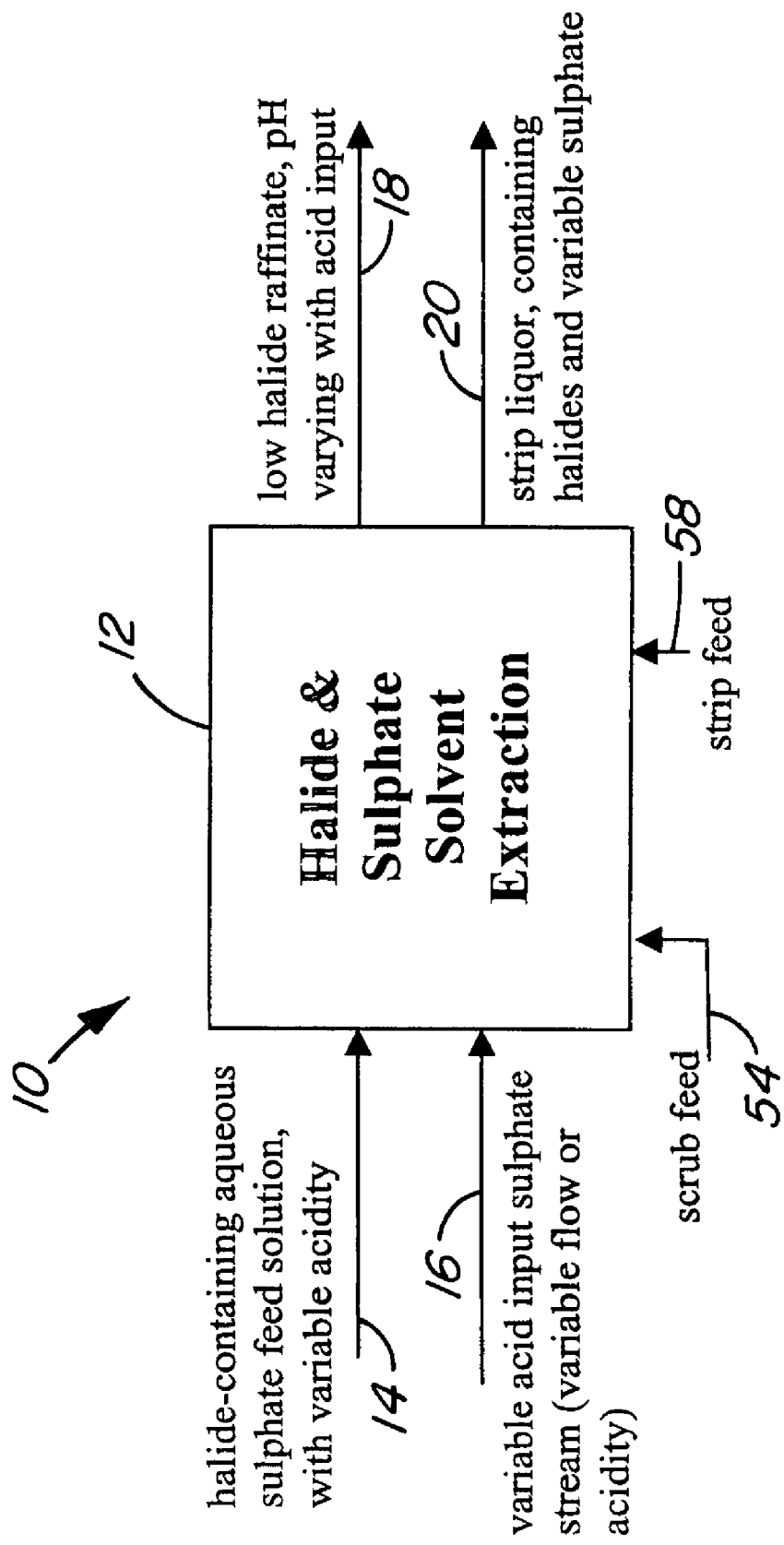
FIG. 1 is a diagrammatical representation of a halide and sulphate extraction process.

FIG. 1 is a general representation of a halide and sulphate extraction process 10. The process 10 comprises a halide and sulphate solvent extraction 12 which has as its input a halide-containing aqueous sulphate feed solution 14 and an acidic sulphate solution 16. The solutions 14 and 16 can be mixed prior to being subjected to the solvent extraction 12.

In practice, the total acidity of the combined solutions 14 and 16 varies from a relatively high acid content (low pH) to a relatively low acid content, i.e. the solution is practically neutral.

In carrying out the process 10, the total acidity of the solutions 14 and 16 and/or the flow rate of the acidic sulphate solution 16 is varied to provide a low halide raffinate 18 and a strip liquor 20 as output from the solvent extraction 12. The low halide raffinate 18 has a varying pH and sulphate content depending on the total acidity of the solutions 14 and 16. The strip liquor 20 has a varying sulphate content also dependent upon the total acidity of the solutions 14 and 16.

For the solvent extraction 12, an organic solvent or mixture of solvents is used as extractant. The extractant is selected to provide the desired output from the solvent extraction 12.

The process 10 will now be described in more detail in the examples set out below.

In one test, zinc sulphate solutions, such as neutral zinc plant solution mixtures (typically 120 g/L Zn, pH 5) and acidic zinc solutions returning from zinc electrowinning ("return acid", typically 55 g/L Zn, 165 g/L $H_2SO_4$), were subjected to solvent extraction at about 40° C. with CYANEX™ 923 extractant. The CYANEX™ 923 extractant was mixed on a 50% volume/volume basis with a product sold under the trademark ORFOM™ SX-11 as diluent. The various zinc sulphate solutions contained about 200 mg/L fluoride and from about 155 to 205 mg/L chloride and different amounts of $H_2SO_4$.

Figure 2:
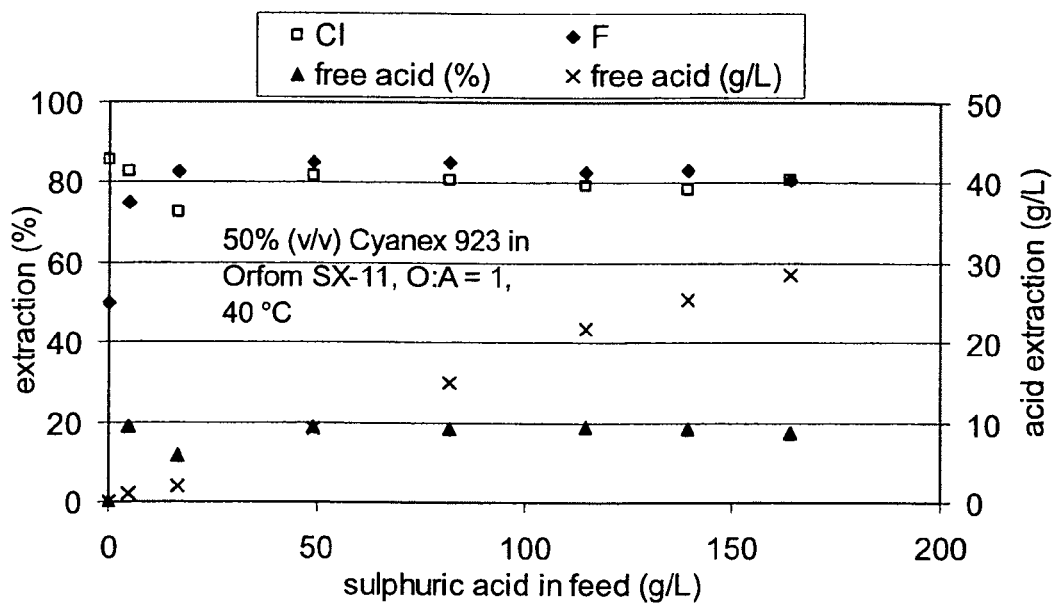
FIG. 2 is a graph in which halide and sulphate extraction efficiencies are plotted against g/L sulphuric acid in the feed solution for one extractant.

The test results are shown in FIG. 2 in which extraction percentage efficiency for chloride and fluoride, as well as for free acid (sulphate), is plotted against g/L sulphuric acid in the feed (i.e. in solutions 14 and 16 combined). The graph also shows the g/L amount of free acid (sulphate) extracted as a function of g/L sulphuric acid in the feed.

As can be seen, for this particular test, the halide extraction efficiency is virtually unaffected by the variation of acid in the feed (except for a drop to 50% efficiency for fluoride at very low acid concentration), whereas the amount of sulphate extracted increases almost linearly with increase of acid in the feed. Therefore, sulphate (acid) extraction can be varied as required by variation of the feed acid concentration while still maintaining halide extraction efficiencies. Those skilled in the art will appreciate that low acid extractions would result in correspondingly low neutralization reagent requirements in the stripping section.

Figure 3:
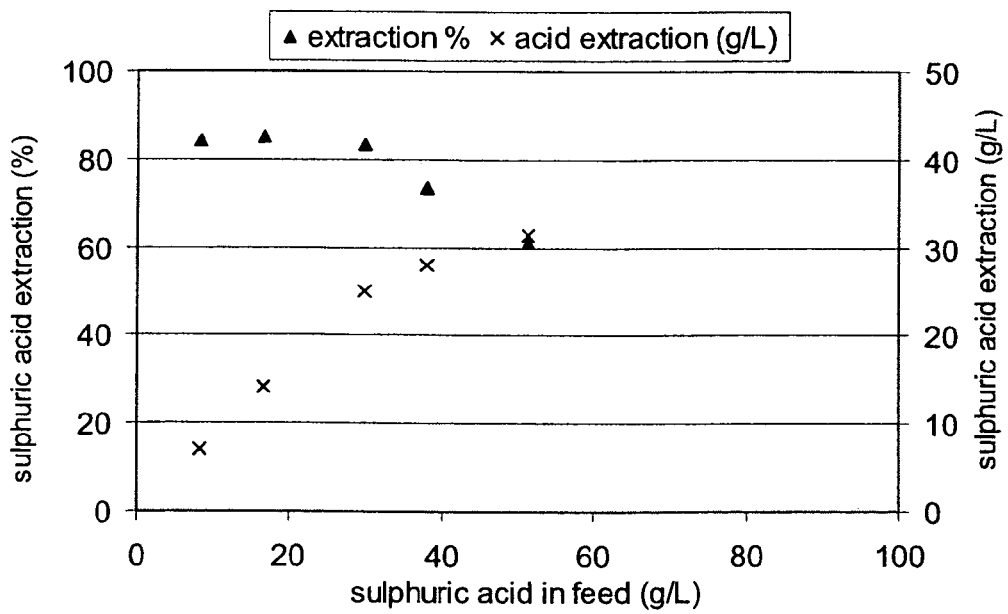
FIG. 3 is a graph in which sulphate extraction efficiency is plotted against g/L sulphuric acid in the feed solution for another extractant.

FIG. 3 gives sulphuric acid (sulphate) extraction data for a zinc sulphate solution (47 g/L Zn). In this case, ALAMINE™ 336 extractant which proves to be a stronger acid extractant than CYANEX™ 923 extractant (compare with FIG. 2 data), was used as extractant. The ALAMINE™ 336 extractant was mixed with a product sold under the trademark EXXSOL™ D80 as diluent in a ratio 20%:80% volume/volume. As is evident from the test results, ALAMINE™ 336 extractant can be used if higher sulphuric acid extraction efficiencies are required, along with halide extractions.

Tests have also been carried out using an extractant comprising a mixture of solvents, such as an ALAMINE™ 336 extractant/tributylphosphate (TBP) system.

The following data illustrates that the composition of the ALAMINE™ 336 extractant/TBP system can be adjusted to give fluoride extraction efficiencies not known in the prior art. Table 1 shows variations in single shake chloride and fluoride extraction efficiencies for various relative concentrations of ALAMINE™ 336 extractant and TBP, with halide extractions maximized by adjustment of acidities. The fluoride extraction efficiency increases with increasing TBP concentration.

TABLE 1

Shake tests results, various TBP mixtures

| ALAMINE-extractant concentration % (v/v) | TBP concentration % (v/v) | Maximized chloride extractions | | Maximized fluoride extractions | |
|---|---|---|---|---|---|
| | | Sulphuric acid (g/L) in aqueous feed | extraction % | Sulphuric acid (g/L) in aqueous feed | extraction % |
| 10 | 10 | 17 | 74 | 17 | 58 |
| 20 | 10 | 17 | 80 | 50 | 64 |
| 20 | 20 | 35–50 | 75 | 50 | 68 |
| 20 | 50 | 17–35 | 85 | 50–100 | 75 |
| 20 | 80 | 17–50 | 80 | 50–100 | 82 |

In the tests shown in Table 1, EXXSOL™ D80 diluent was used as diluent, except for the 80% TBP case. The ratio of organic to aqueous phase (o:a) was 1:1 and the temperature was 40° C. Stripping involved five contacts (o:a =10, v/v) with concentrated ammonia, followed by two water washes. In the 80% TBP case the amount of fluoride was reduced from a value of 110 mg/L down to 20 mg/L and chloride from 200 mg/L to 35 mg/L. Acid extractions were not measured but for these o:a =1:1 shakes, acid extractions would be expected to be in the range of 8 to 16 g/L for 10% ALAMINE™ 336 extractant and 16 to 35 g/L for 20% ALAMINE™ 336 extractant. Zinc concentrations were between 130 and 150 g/L.

Figure 4:
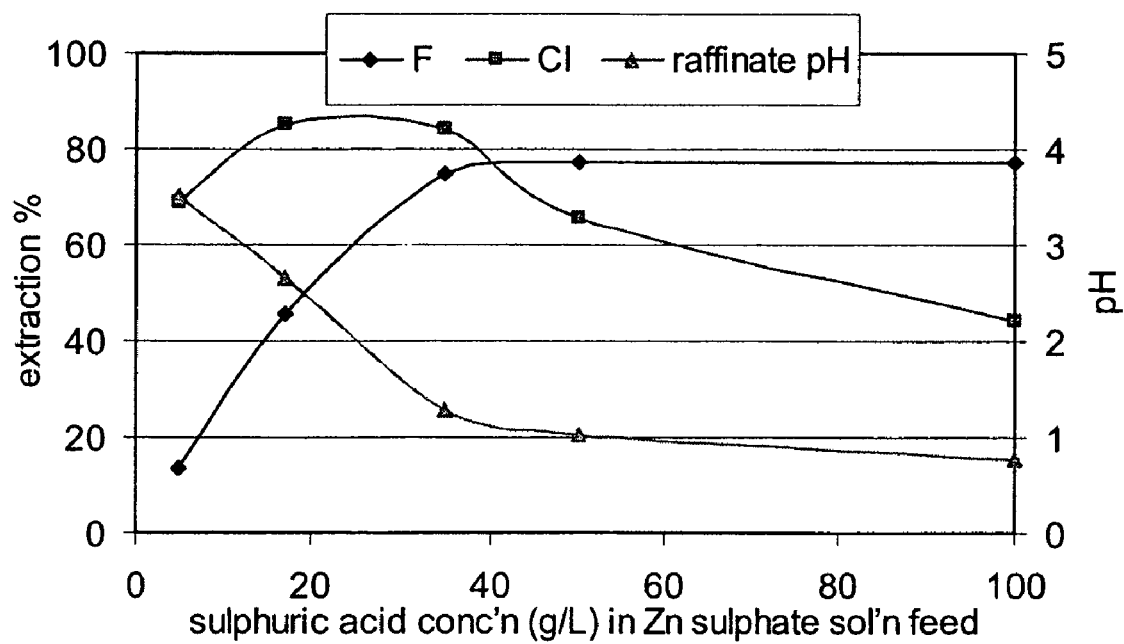
FIG. 4 is a graph illustrating the variation of extraction efficiencies versus sulphuric acid in the feed solution for an extractant comprising a mixture of solvents.

FIG. 4 shows the variation of extraction efficiencies for the 50% TBP mixture in Table 1. Higher acidity favoured fluoride extraction efficiency more than chloride extraction. The compromise in acidity will depend on process requirements.

Halide extractions are variable depending on extractant concentrations and acidities. The presence of certain dissolved metals (iron, magnesium, to some extent, but especially aluminum) also have an effect on fluoride extraction. Equilibrium extractions decrease slightly with temperature increase from ambient to 40° C.

Figure 5A:
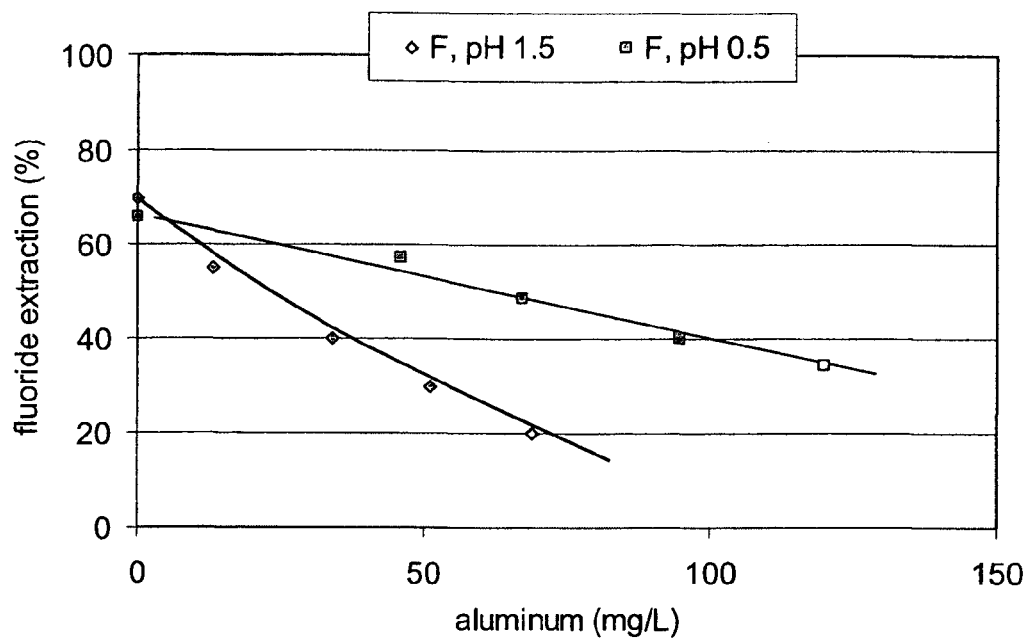
FIGS. 5a and b are graphs illustrating the dependence of fluoride extraction efficiencies on aluminum and magnesium in the feed solution, respectively.
Figure 5B:
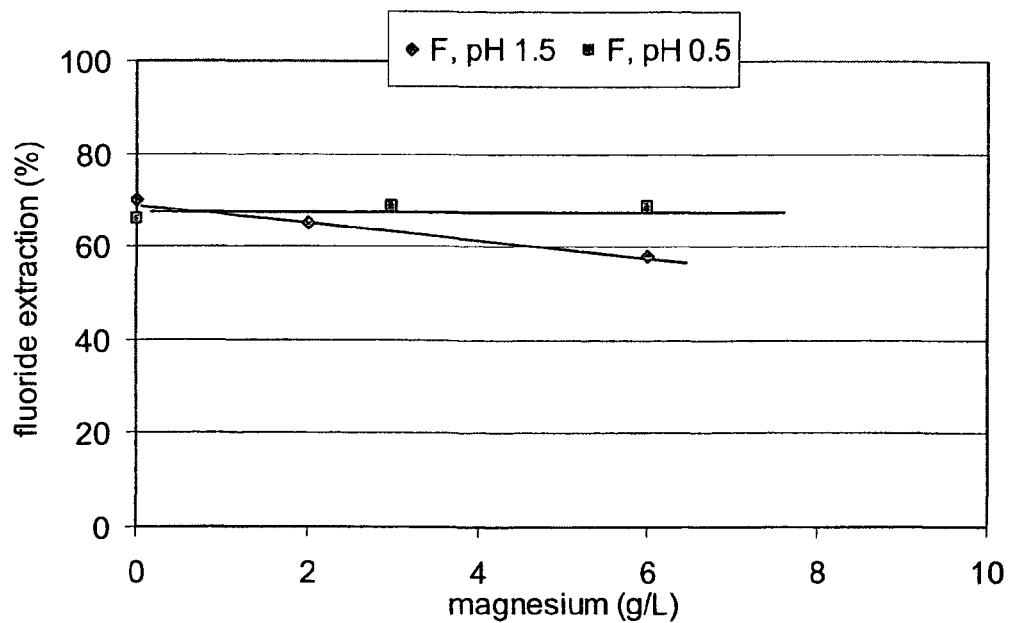

The effects on fluoride removal of the concentrations of dissolved aluminum and magnesium are shown in FIGS. 5a and b, respectively. In particular, elevated concentrations of aluminum or magnesium could significantly impede fluoride extraction and consideration should be given to controlling concentrations of these metals in the halide solvent extraction feed stream 14. Increased acidity can partially offset the effects of the fluoride complexation of these metals in solution, although an increase in acidity would negatively affect chloride extractions (FIG. 4). Again, selected conditions will depend on process requirements.

Figure 6A:
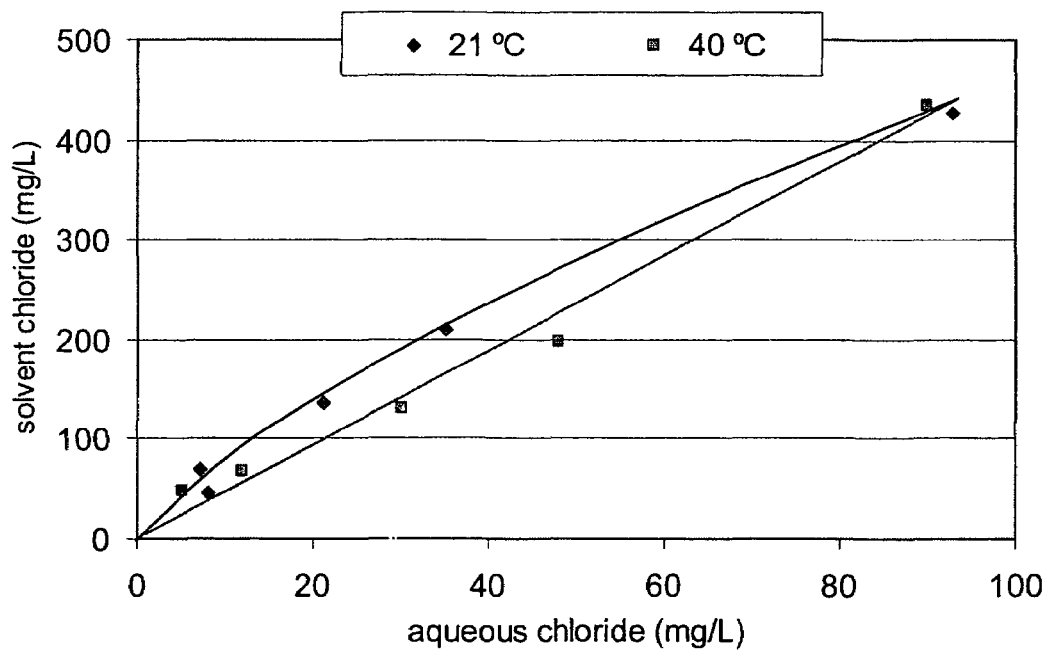
FIGS. 6a and b are graphs illustrating the temperature dependence of chloride and fluoride extraction efficiencies, respectively.
Figure 6B:
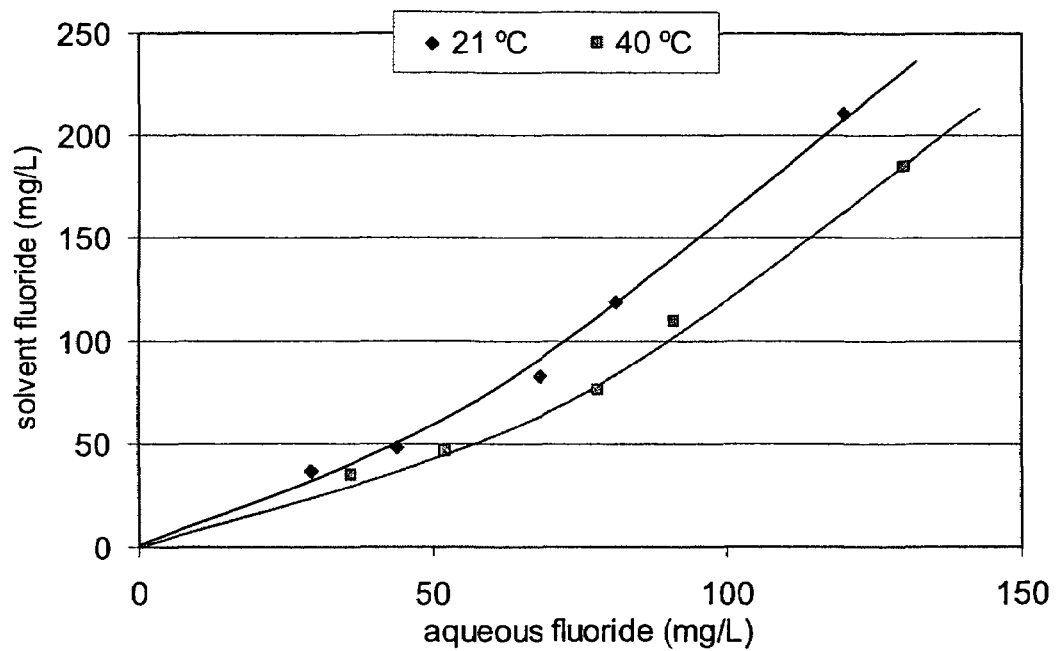

FIGS. 6a and b show an example of the effect of temperature on extraction isotherms for fluoride and chloride, respectively, where the acidity was controlled so that all raffinates were at pH 1.4. As seen, the temperature dependencies are quite modest. It is known to practice elevated temperatures to assist in phase disengagements, and the modest decreases in extraction efficiencies would be tolerable.

The results for other novel halide extractant systems given in Table 2, illustrate the variation of halide extraction efficiencies with acidity, expressed in terms of raffinate pH.

Halide extractions were optimized by adjustment of acidity (as indicated by raffinate pH) for an extractant mixture of ALAMINE™ 336 extractant and CYANEX™ 923 extractant (Tests 1–7). This involved a compromise in pH since chloride extraction efficiency increased with pH in this range and fluoride extraction decreased with increasing pH.

Tests 8 to 13 in Table 2 illustrate the increases in distribution coefficients for both halides obtained with increased extractant concentrations. The selection of the extractant system will depend on process requirements.

TABLE 2

Data on halide extractions from acidified zinc sulphate electrolyte for various raffinate pH values for various organic mixtures in Exxsol ™ D80

| Test # | Solvent | Raffinate pH | Equilibrium concentrations (mg/L) | | | | Distribution coefficients | |
|---|---|---|---|---|---|---|---|---|
| | | | $Cl_{(aq)}$ | $F_{(aq)}$ | $Cl_{(org)}$ | $F_{(org)}$ | $D_{Cl}$ | $D_F$ |
| 1 | 10% ALAMINE 336 extractant + 25% CYANEX 923 extractant | 0.8 | 70 | 59 | 205 | 271 | 2.93 | 4.59 |
| 2 | 10% ALAMINE 336 extractant + 25% CYANEX 923 extractant | 1 | 60 | 68 | 215 | 262 | 3.58 | 3.85 |
| 3 | 10% ALAMINE 336 extractant + 25% CYANEX 923 extractant | 1 | 55 | 84 | 220 | 246 | 4.00 | 2.93 |

TABLE 2-continued

Data on halide extractions from acidified zinc sulphate electrolyte for various raffinate pH values for various organic mixtures in Exxsol™ D80

| Test # | Solvent | Raffinate pH | $Cl_{(aq)}$ | $F_{(aq)}$ | $Cl_{(org)}$ | $F_{(org)}$ | $D_{Cl}$ | $D_F$ |
|---|---|---|---|---|---|---|---|---|
| 4 | 10% ALAMINE 336 extractant + 25% CYANEX 923 extractant | 1.2 | 55 | 76 | 220 | 254 | 4.00 | 3.34 |
| 5 | 10% ALAMINE 336 extractant + 25% CYANEX 923 extractant | 1.5 | 45 | 99 | 230 | 231 | 5.11 | 2.33 |
| 6 | 10% ALAMINE 336 extractant + 25% CYANEX 923 extractant | 2 | 40 | 120 | 235 | 210 | 5.88 | 1.75 |
| 7 | 10% ALAMINE 336 extractant + 25% CYANEX 923 extractant | 2.4 | 25 | 170 | 250 | 160 | 10.00 | 0.94 |
| 8 | 10% ALAMINE 336 extractant + 50% CYANEX 923 extractant | 1 | 40 | 43 | 235 | 287 | 5.88 | 6.67 |
| 9 | 20% ALAMINE 336 extractant + 25% CYANEX 923 extractant | 1 | 50 | 62 | 225 | 268 | 4.50 | 4.32 |
| 10 | 10% ALAMINE 336 extractant + 10% CYANEX 923 extractant | 1 | 90 | 100 | 185 | 230 | 2.06 | 2.3 |
| 11 | 20% ALAMINE 336 extractant + 10% CYANEX 923 extractant | 1 | 65 | 84 | 210 | 246 | 3.23 | 2.93 |
| 12 | 25% CYANEX 923 extractant | 0.8 | 55 | 55 | 220 | 275 | 4.00 | 5.00 |
| 13 | 25% CYANEX 923 extractant | 1 | 55 | 63 | 220 | 267 | 4.00 | 4.24 |

The acidified zinc sulphate electrolyte for the tests in Table 2 was prepared using a 120 g/L Zn neutral electrolyte with sulphuric acid (25%) added to provide the target raffinate pH. These were single shake tests (o:a=1.1) at ambient temperature. Fresh organic reagents were used.

The variation of chloride extraction efficiencies with acidity was also observed with a secondary and a quaternary amine as shown in Table 3. The secondary amine extractant is the product sold under the trademark AMBERLITE™ LA-2 and the quaternary amine extractant is the product sold under the trademark ALIQUAT™ 336.

TABLE 3

Data on halide extractions from acidified zinc sulphate electrolyte for various raffinate pH values for a quaternary and a secondary amine.

| Test # | Solvent | raffinate pH | $Cl_{(aq)}$ | $F_{(aq)}$ | $Cl_{(org)}$ | $F_{(org)}$ | $D_{Cl}$ | $D_F$ |
|---|---|---|---|---|---|---|---|---|
| 1 | 5% decanol, 5% Aliquat 336 extractant | 2.3 | 4 | 110 | 256 | 10 | 64 | 0.1 |
| 2 | 5% decanol, 5% Aliquat 336 extractant | 2.0 | 6 | 110 | 234 | 30 | 39 | 0.3 |
| 3 | 5% decanol, 5% Aliquat 336 extractant | 1.4 | 6 | 110 | 234 | 30 | 39 | 0.3 |
| 4 | 5% decanol, 5% Aliquat 336 extractant | 0.7 | 11 | 110 | 232 | 20 | 21 | 0.2 |
| 5 | 4% decanol, 10% Amberlite LA-2 extractant | 2.2 | 4 | 85 | 256 | 35 | 64 | 0.4 |

TABLE 3-continued

Data on halide extractions from acidified zinc sulphate electrolyte for various raffinate pH values for a quaternary and a secondary amine.

| Test # | Solvent | raffinate pH | Equilibrium concentrations (mq/L) | | | | Distribution coefficients | |
|---|---|---|---|---|---|---|---|---|
| | | | $Cl_{(aq)}$ | $F_{(aq)}$ | $Cl_{(org)}$ | $F_{(org)}$ | $D_{Cl}$ | $D_F$ |
| 6 | 4% decanol, 10% Amberlite LA-2 extractant | 1.6 | 3 | 90 | 237 | 50 | 79 | 0.6 |
| 7 | 4% decanol, 10% Amberlite LA-2 extractant | 0.9 | 6 | 90 | 234 | 40 | 39 | 0.4 |
| 8 | 4% decanol, 10% Amberlite LA-2 extractant | 0.3 | 9 | 100 | 191 | 20 | 21 | 0.2 |

The diluent used for the solvent in Table 3 was 80% EXXSOL™ D80 diluent and 20% of a product sold under the trademark SOLVESSO™ 100. The extractions were carried out at 40° C. (a:o =1:1). The organic was initially stripped by effecting five contacts (o:a =10,v/v) with concentrated ammonia. The organic was then conditioned with a solution mixture containing 0.2 M sulphuric acid and 2 M sulphate. The zinc sulphate electrolyte contained about 120 g/L Zn.

Generally the above results show that halide extraction efficiencies can be maintained while the amount of sulphate extraction can be controlled by selecting the appropriate organic extractant and/or varying the acidity of the aqueous sulphate solution.

Stripping tests on 25% CYANEX™ 923 extractant in ORFOM™ SX-11 diluent were also carried out. These tests were done to compare the stripping efficiency of water, sodium carbonate solution and caustic solution. The tests were carried out at ambient temperature. The ratio of aqueous phase to organic phase was 1:1. The test results are shown in Table 4. Water was inefficient, especially for fluoride. Caustic and soda ash proved equally efficient, fluoride stripping being quantitative and chloride stripping being about 80% efficient.

Table 4 also implies that the halide extractions were 78%, with an accompanying sulphuric acid extraction of about 1 g/L. This is another example of the low sulphuric acid extractions that can accompany high halide extraction efficiencies, when the sulphuric acid concentration in the feed is low. In the case of carbonate stripping for this level of loaded sulphate, reagent usage could be as low as 1.5 to 2 g sodium carbonate per L solvent while still avoiding carbon dioxide generation.

TABLE 4

Stripping shake test data on 25% CYANEX 923 extractant in ORFOM SX-11 loaded with halides and sulphate

| Sample | Fluoride (mg/L) | Chloride (mg/L) | Free sulphuric acid (g/L) | pH |
|---|---|---|---|---|
| Acidic zinc solution feed | 180 | 180 | 15.75 | |
| Extraction raffinate | 40 | 40 | 15 | |
| Solvent (calculated) | 140 | 140 | 0.75 | |
| Solutions after stripping: | | | | |
| 0.1 M NaOH | 140 | 110 | | 12.8 |
| 0.2 M NaOH | 140 | 115 | | 13.1 |
| 0.1 M Na₂CO₃ | 150 | 115 | | 10.2 |
| 0.2 M Na₂CO₃ | 150 | 115 | | 10.5 |
| Distilled water | 50 | 100 | | |

Where, for example, ammonia stripping leads to an ammonium sulphate strip liquor that is processed for fertilizer production, the fertilizer market or some other factor may require a reduction or stop in production. In such a case, the acid input to extraction can be turned up or down accordingly to vary the ammonium sulphate production. In a zinc plant, this means varying the proportion of electrowinning acidic zinc sulphate solution to neutral zinc sulphate solution. More specifically, if the solvent is 25% CYANEX™ 923 extractant, a feed stream acidified to 195 g/L sulphuric acid may be used to give acid extraction as high as 35 g sulphuric acid per L of solvent flow. Alternatively, for a feed stream acidified with 16 g/L sulphuric acid, only 1 g/L sulphuric acid was extracted, as in Table 4.

If no ammonium salts at all are desired, sodium carbonate stripping can be effected to give a waste stream, and the sodium carbonate reagent requirement minimized by turning down the acid extraction.

Ammonia stripping of chloride and sulphate can produce a concentrated ammonium sulphate solution that can be fed to a crystallization or granulation process for ammonium sulphate fertilizer production.

Ammonia stripping was tested mostly in the case of the ALAMINE™ 336 extractant/TBP systems. In the case of CYANEX™ 923 extractant, stripping by soda ash and caustic was tested. Soda ash was used in excess to avoid carbon dioxide evolution during stripping.

For continuous operation of the process, a variety of solvent extraction contact equipment can be used, such as mixer-settlers, or columns (e.g. pulsed columns). The process has been piloted in mixer-settlers and BATEMAN pulsed columns.

Figure 7:
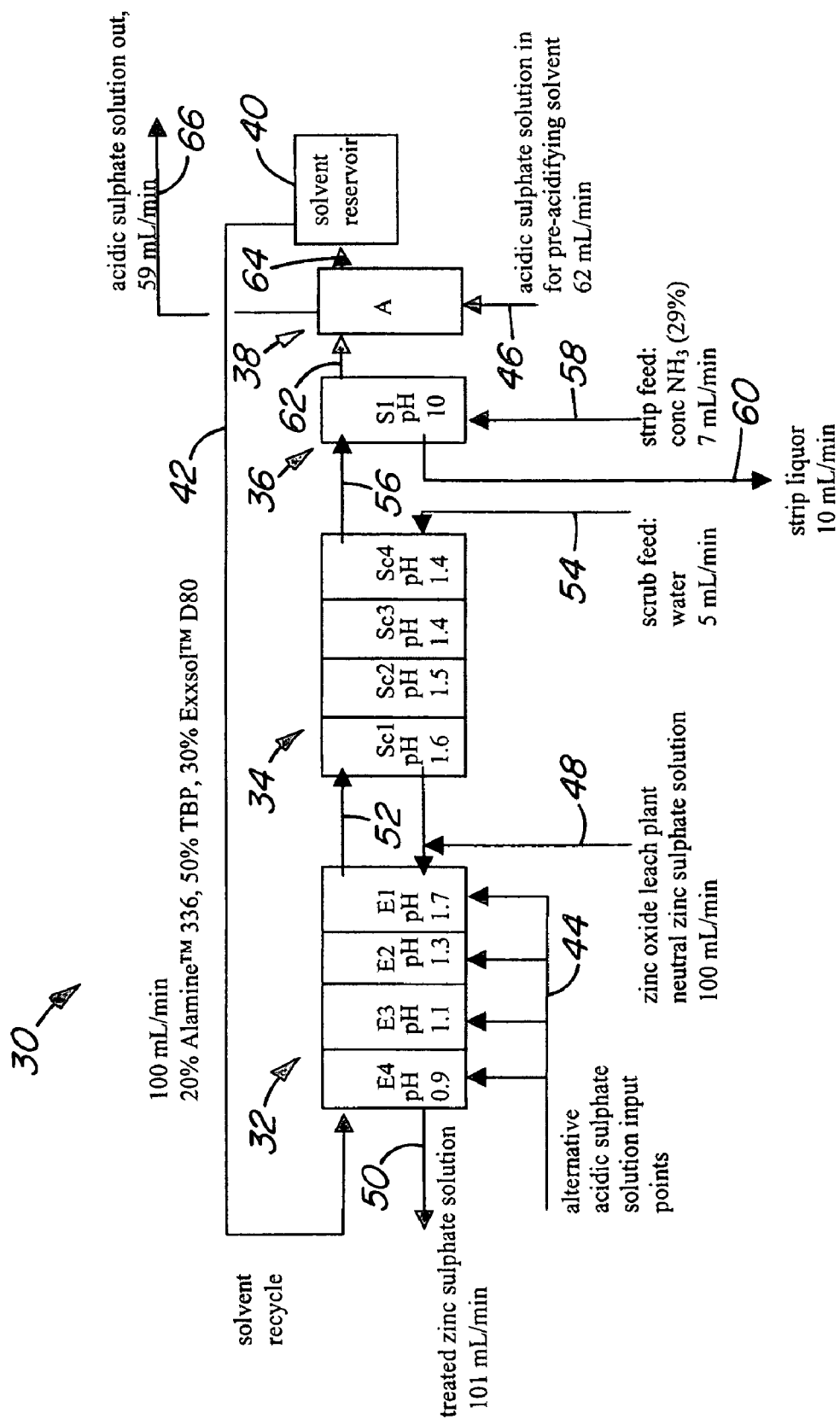
FIG. 7 is a flow diagram illustrating a continuous mixer-settler pilot plant.

FIG. 7 shows a continuous mixer-settler pilot plant 30 used for testing the 20% ALAMINE™ 336 extractant/50% TBP system in Table 1.

The plant 30 comprises an extraction section 32, a scrubbing section 34, a stripping section 36 and a pre-acidification section 38.

A solvent reservoir 40 is provided downstream of the pre-acidification section 38. The solvent (organic) travels from the extraction section 32, where solvent extraction takes place, to the scrubbing section 34 where the loaded solvent is washed, to the stripping section 36 where the loaded solvent is stripped, to the pre-acidification section 38, where the stripped solvent can be acidified, and then to the solvent reservoir 40, from where the solvent is recycled (stream 42) to the extraction section 32 for a new extraction cycle.

The extraction section 32 comprises a plurality of mixer-settler stages (extraction cells) E1, E2, E3 and E4.

In a first test, the extraction cells E1–E4 were maintained at pH values 1.7, 1.3, 1.1 and 0.9, respectively, as indicated in FIG. 7. This was achieved by acid addition to the pre-acidification section 38 (stream 46). In this test, 24 g sulphuric acid was extracted per L of organic flow. Fluoride extraction was 78% and chloride extraction 90%.

In a second test, the pH of extraction cell E1 was maintained at a value of 1.3 and the other cells were maintained at pH values of about 1. This was achieved by acid addition to each of the extraction cells (stream 44), and no pre-acidifying of the organic in the pre-acidification section 38 was effected. In this test, 38 g sulphuric acid was extracted per L of organic flow. Fluoride extractions between 80 and 85% and chloride extractions between 85 and 90% were obtained.

These tests demonstrate that high halide extraction efficiencies can be maintained while varying the pH values for the extraction cells.

It should be noted that acidification can be effected by adding acidic sulphate solution to the extraction cells or to the pre-acidification section 38 or both.

In carrying out the first test, the feed to the extraction section 32 was a zinc plant neutral, feed zinc sulphate solution (stream 48) at a rate of about 100 mL/min. The stream 48 typically contained 120 g/L Zn, as well as 10 mg/L Al, 7.2 g/L MgSO$_4$, 160 mg/L F and 270 mg/L Cl. The temperature in all extraction cells was 40° C.

As indicated above, the solvent used for carrying out the extraction comprised a mixture of 20% ALAMINE™ 336 extractant and 50% TBP in 30% EXXSOL™ D80 and was recycled (stream 42) at a rate of about 100 mL/min.

The acidification of the organic in the extraction cells (stream 44) was effected with a simulated dehalogenated acidic zinc sulphate solution (50% raffinate and 50% 320 g/L sulphuric acid).

The output from the extraction section 32 is treated (dehalogenated) zinc sulphate solution (stream 50) at about 100 mL/min and loaded solvent (stream 52) which was fed to the scrubbing section 34.

The scrub feed (stream 54) was water which was fed to the scrubbing section 34 at a rate of about 5 mL/min.

The scrubbing was effected in four scrubbing stages Sc1, Sc2, Sc3 and Sc4 at pH values of 1.6, 1.5, 1.4 and 1.4, respectively, as indicated in FIG. 7.

The scrubbed extractant 56 was fed to the stripping section 36 where it was subjected to stripping at pH 10 with a concentrated ammonia (29%) (stream 58), which was fed to the stripping section 36 at a rate of about 7 ml/min. The ammonia stripping feed was a mixture of 15 parts water and 85 parts concentrated (15M) aqueous ammonia.

The outputs from the stripping section 36 are the strip liquor (stream 60) containing the halides and sulphate and stripped solvent (stream 62) which was acidified in the pre-acidification section 38 with acidic sulphate solution (stream 46), whereafter the acidified extractant (stream 64) was fed to the reservoir 40 for recycle to the extraction section 32. The flow rate for the acidic sulphate solution was 63 L/min. The outflow of acidic sulphate solution (stream 66) was at 59 mL/min.

The strip feed rate was 8.4 mL/min, giving 12.6 mL/min strip liquor at 64 g/L sulphate, implying 24 g sulphate extracted per L of solvent flow.

The CYANEX™ 923 extractant system was not piloted, but similar equipment configurations are anticipated.

The specific halide concentrations tested with the solvent systems were less than 300 mg/L, but are expected to apply to halide concentrations much higher than this as well.

Acidity of the feed is the dominating factor affecting halide and sulphate extractions in the case of amine systems, as discussed above. In the case of fluoride, aluminum concentrations in the feed must be kept below 20 mg/L to avoid significant decreases in extraction efficiency. This has been tested only for the ALAMINE™ 336 extractant/TBP system, but also likely to be critical for the CYANEX™ 923 extractant system.

In some of the piloting, a purified acidic zinc electrolyte (typically 10 mg/L F, 100–200 mg/L Cl, <1 mg/L Cd) was used as a scrub feed, to scrub cadmium and arsenic from the organic. This resulted in the Zn:Cl ratio in ammonium sulphate strip liquor being as high as 0.24 (mol/mol), with zinc concentrations being as high as 2 g/L. Use of water as scrub feed resulted in strip liquor with 20 mg/L zinc. Plugging of organic lines with zinc ammonium sulphate crystals occurred during operation with the acidic zinc electrolyte scrub. This problem did not occur when using a water scrub.

Oxidized manganese contained in the acidic zinc electrolyte returned from electrowinning severely discoloured the ALAMINE™ 336 extractant/TBP solvent unless the electrolyte was treated with a reductant. Sodium bisulphite was mixed with the acidic zinc electrolyte in sufficient amounts to remove the pink manganese colour of the electrolyte. This counteracted the severe organic discolouration.

Some degradation of the ALAMINE™ 336 extractant/ TBP solvent occurred when scrubbing was done with acidic zinc electrolyte. The degradation involved the build up of solid phosphorus containing species in the solvent, which is discussed further, below. After operation of a pulsed column pilot over a period of 7 wks, with pulsed columns actually operating with fresh feed for 400 h, degradation of extraction efficiency was detected (45% loss for chloride, perhaps 10% for fluoride and 50% for sulphate). On the other hand, a mixer-settler mini-pilot, with water scrubbing, was set up for about 3.5 months, with mixer-settlers actually operating with fresh feed again for a total of 400 h. High efficiencies for chloride (80% to 90% removal) and fluoride (70% to 80% removal) were maintained during this time, and no loss in extraction efficiency was detected in standard tests at the end of this period. Water soluble solids (5 g per L of organic) and water were isolated from the organic by hexane addition to the organic sample obtained at the end of this 400 h period of mixer-settler operation, while 68 g of water soluble solids per L of organic were isolated from a 400-h sample of organic from the column pilot. The solids were not identified but were shown to contain a phosphorus species by 31P NMR, and may be caused by TBP degradation products tying up the ALAMINE™ 336 extractant. During the 400-h mixer-settler period, about 40% of the organic was spilled and replaced with fresh organic; but this could not explain the differences in extraction efficiencies and impurity contents of the organic samples from the two pilot tests. The water scrub is believed to gradually wash the organic and prevent the build-up of impurities which inhibit extraction of halides and sulphate.

One advantage of the process 10 is the control of the relative halide and sulphate extraction efficiency by appropriate selection of organic extractant mixture and acidity or pH of the aqueous phase. Particularly, CYANEX™ 923 extractant provides the added flexibility of being able to vary sulphate (acid) extraction by variation of feed acid concentration and still maintain halide extraction efficiencies.

The inventors are not aware of TBP being mixed with ALAMINE™ 336 extractant, or other tertiary alkylamine for the purpose of increasing fluoride extraction. As far as the inventors are aware, the prior art gives only one example, namely Soviet Patent SU 861313, of fluoride extraction, of limited efficiency. The present process achieves fluoride extraction efficiencies not obtained by the prior art. Also, the prior art does not teach how to maintain high halide extraction efficiencies while varying acidity to control the amount of sulphate extracted. The advantage of halide removal with a phosphine oxide extractant such as CYANEX™ 923 extractant is that halide extraction efficiencies can be maintained while sulphuric acid coextraction can be adjusted by varying the amount of acid fed to the process.

Also, the inventors are not aware of CYANEX™ 923 extractant used expressly for fluoride, chloride or perchlorate removal from zinc sulphate solutions. While UK Patents 1,371,302 and 1,366,380 state that ALIQUAT™ extractant and a product sold under the trademark ADOGEN™ 381 could extract chloride with minimum sulphate, this was done by adjusting the concentration of extractant to match the concentration of chloride to be extracted.

The inventors are not aware of an ALAMINE™ 336 extractant/TBP mixture being used to remove perchlorate from zinc electrolyte, although perchlorate is reported in Soviet Patent SU 667500 as being useful for stripping halides and zinc from ALAMINE™ 336 extractant.

Although certain preferred embodiments of the present invention have been shown and described in detail, it should be understood that various changes and modifications may be made therein without departing from the scope of the appended claims.

The invention claimed is:

1. A method of extracting a halide and sulphate from an aqueous sulphate solution containing the halide, comprising the steps of:
   subjecting the sulphate solution to solvent extraction with an extractant to extract at least part of said halide and part of said sulphate from the solution to produce a loaded extractant; and
   controlling the amount of said sulphate extracted by varying the acidity of the aqueous solution, wherein said varying is effected by feeding a second feed stream comprising an acidic sulphate solution to said solvent extraction so as to be subjected to the solvent extraction along with said aqueous sulphate solution.

2. The method according to claim 1, wherein the extractant comprises a phosphine oxide.

3. The method according to claim 2, wherein the phosphine oxide comprises a mixture of four trialkylphosphine oxides, namely $R_3P(O)$, $R_2R'P(O)$, $RR'_2P(O)$ and $R'_3P(O)$, where R=[$CH_3(CH_2)_6CH_2$—]: normal octyl and R'=[$CH_3(CH_2)_4CH_2$—]: normal hexyl.

4. The method according to claim 1, wherein the extractant comprises a tertiary amine.

5. The method according to claim 4, wherein the extractant comprises a trialkylamine.

6. The method according to claim 1, wherein the extractant comprises a mixture of a phosphine oxide and a tertiary amine.

7. The method according to claim 6, wherein the phosphine oxide comprises a mixture of four trialkylphosphine oxides, namely $R_3P(O)$, $R_2R'P(O)$, $RR'_2P(O)$ and $R'_3P(O)$, where R=[$CH_3(CH_2)_6CH_2$—]: normal octyl and R'=[$CH_3(CH_2)_4CH_2$—]: normal hexyl and the tertiary amine comprises a trialkylamine.

8. The method according to claim 1, wherein the extractant comprises a mixture of a tertiary amine and a trialkylphosphate.

9. The method according to claim 8, wherein the extractant comprises a mixture of a trialkylamine and a trialkylphosphate.

10. The method according to claim 9, wherein the halide is fluoride.

11. The method according to claim 10, wherein the extractant comprises a mixture of the trialkylamine and tributylphosphate (TBP).

12. The method according to claim 9, wherein the extractant comprises a mixture of the trialkylamine and tributylphosphate (TBP).

13. The method according to claim 1, wherein the halide is selected from the group consisting of fluoride, chloride and perchlorate.

14. The method according to claim 1, wherein the solvent extraction is carried out in a number of successive stages at different pH values.

15. The method according to claim 1, wherein the loaded extractant is subjected to stripping with an aqueous strip solution to produce a strip liquor containing said halide and sulphate.

16. The method according to claim 15, wherein the strip solution comprises a neutralizing agent.

17. The method according to claim 16, wherein the neutralizing agent is selected from the group consisting of ammonia, sodium hydroxide and sodium carbonate.

18. The method according to claim 1, wherein said aqueous sulphate solution containing the halide and said second sulphate solution are combined with one another prior to being subjected to said solvent extraction.

19. The method according to claim 1, wherein said varying of the acidity of the aqueous sulphate solution containing the halide is effected by varying a rate of feed of said second feed stream to said solvent extraction.

20. The method according to claim 1, wherein said varying of the acidity of the aqueous sulphate solution is effected by adjusting the acidity of said second feed stream.

21. The method according to claim 1, wherein the halide comprises fluoride and the extractant comprises a mixture of a tertiary amine and a trialkylphosphate.

22. The method according to claim 21, wherein the trialkylphosphate comprises tributylphosphate (TBP).

23. The method according to a claim 1, wherein the halide comprises perchlorate and the extractant comprises a mixture of a tertiary amine and a trialkylphosphate.

24. The method according to claim 23, wherein the aqueous sulphate solution is that of a base metal.

25. The method according to claim 24, wherein the base metal is zinc.

26. The method according to claim 23, wherein the tertiary amine is a trialkylamine.

27. A method according to claim 1, wherein the halide comprises chloride and the extractant comprises a secondary amine.

28. The method according to claim 27, wherein the solvent extraction is carried out in a pH range of from about 2.3 to 0.7.

29. A method according to claim 1, wherein the halide comprises chloride and the extractant comprises a quaternary amine.

30. The method according to claim 29, wherein the solvent extraction is carried out in a pH range of from about 2.2 to 0.3.

31. A method according to claim 1, wherein the halide comprises chloride and fluoride and the extractant comprises a mixture of a tertiary amine and a trialkylphosphate to extract at least part of the chloride and the fluoride.

32. The method according to claim 31, wherein the tertiary amine is a trialkylamine.

33. The method according to claim 31, wherein the extractant comprises a mixture of a trialkylamine and tributylphosphate (TBP).

34. A method of extracting a halide and sulphate from an aqueous base metal sulphate solution containing the halide, comprising subjecting the sulphate solution to solvent extraction with a phosphine oxide to extract at least part of said halide and part of said sulphate from the aqueous solution.

35. The method according to claim 34, wherein the aqueous solution is a zinc sulphate solution.

36. The method according to claim 35, further comprising the step of controlling the amount of said sulphate extracted by varying the acidity of the aqueous solution, wherein said varying is effected by feeding a second feed stream comprising an acidic sulphate solution to said solvent extraction so as to be subjected to the solvent extraction along with said aqueous sulphate solution.

37. A method of extracting chloride and fluoride from an aqueous sulphate solution containing the chloride and the fluoride, comprising the step of subjecting the sulphate solution to solvent extraction with an extractant comprising a mixture of a phosphine oxide and a tertiary amine to extract at least part of the chloride and the fluoride.

38. The method according to claim 37, wherein the phosphine oxide comprises a mixture of four trialkylphosphine oxides, namely $R_3P(O)$, $R_2R'P(O)$, $RR'_2P(O)$ and $R'_3P(O)$, where $R=[CH_3(CH_2)_6CH_2—]$: normal octyl and $R'=[CH_3(CH_2)_4CH_2—]$: normal hexyl and the tertiary amine comprises a trialkylamine.

* * * * *